(12) United States Patent
Graae et al.

(10) Patent No.: US 6,830,802 B2
(45) Date of Patent: Dec. 14, 2004

(54) ROOFING MEMBRANE

(75) Inventors: Niels Graae, Werne (DE); Christian Birkner, Faulquemont (FR)

(73) Assignee: Icopal GmbH, Werne (DE)

( * ) Notice: Subject to any disclaimer, the term of this patent is extended or adjusted under 35 U.S.C. 154(b) by 0 days.

(21) Appl. No.: 10/302,355

(22) Filed: Nov. 22, 2002

(65) Prior Publication Data

US 2003/0101671 A1 Jun. 5, 2003

Related U.S. Application Data

(63) Continuation of application No. PCT/EP01/04471, filed on Apr. 19, 2001.

(30) Foreign Application Priority Data

May 25, 2000 (DE) .................................. 200 09 382 U

(51) Int. Cl.$^7$ .............................................. C08L 95/00
(52) U.S. Cl. ..................... 428/141; 428/143; 428/147; 428/150; 428/195; 428/489
(58) Field of Search ............................... 428/141, 143, 428/147, 150, 195, 489, 490, 491, 40.3, 422, 142, 144, 145, 198; 523/450; 52/408, 409

(56) References Cited

U.S. PATENT DOCUMENTS

| | | | | |
|---|---|---|---|---|
| 3,138,897 A | * | 6/1964 | Theobald | 52/420 |
| 3,190,040 A | * | 6/1965 | McCorkle | 52/420 |
| 4,711,672 A | * | 12/1987 | Gorter et al. | 106/274 |
| 4,738,884 A | * | 4/1988 | Algrim et al. | 428/57 |
| 5,187,905 A | * | 2/1993 | Pourtau et al. | 52/144 |
| 6,150,439 A | * | 11/2000 | Keiichi et al. | 524/68 |
| 6,306,937 B1 | * | 10/2001 | Fields | 524/62 |

FOREIGN PATENT DOCUMENTS

| | | |
|---|---|---|
| DE | 197 16 543 A | 10/1998 |
| EP | 0 203 609 A | 1/1986 |
| FR | 2 457 767 A | 12/1980 |
| FR | 2 706 506 A | 12/1994 |

* cited by examiner

*Primary Examiner*—Harold Pyon
*Assistant Examiner*—Alicia Chevalier
(74) *Attorney, Agent, or Firm*—Henry M. Feiereisen

(57) ABSTRACT

A roofing membrane, includes at least one support layer and a plurality of strips arranged in spaced-apart disposition at least on one side of the support layer and made of bituminous material and have a penetration depth between about 120 and 170 at a temperature of 50° C., and a softening point between about 100° C. and 110° C. The strips of bituminous material are separated from one another by a layer of scattered material and are covered by a fusible film. The film is composed of a plurality of strips which are oriented in parallel relationship to the bituminous strips but not interconnected.

10 Claims, 2 Drawing Sheets

ROOFING MEMBRANE

CROSS-REFERENCES TO RELATED APPLICATIONS

This application is a continuation of prior filed copending PCT International application no. PCT/EP01/04471, filed Apr. 19, 2001, which was not published in English and which designated the United States and on which priority is claimed under 35 U.S.C. §120, the disclosure of which is hereby incorporated by reference.

This application claims the priority of German Patent Application, Ser. No. 200 09 382.7, filed May 25, 2000, pursuant to 35 U.S.C. 119(a)–(d), the disclosure of which is incorporated herein by reference.

BACKGROUND OF THE INVENTION

The present invention relates, in general, to a roofing membrane.

Conventional roofing membranes typically include a support layer and a plurality of strips arranged in spaced-apart disposition on one side of the support layer and made of bituminous material to enable a gluing of individual roofing membranes. The strips are separated from one another by a layer of scattered material and covered by a fusible film. The fusible film is arranged upon the roofing membrane over the entire surface of the side that carries the strips of material. As a consequence, moisture can accumulate in the area of the layer of scattered material between the individual strips of bituminous material between the film and the layer of scattered material. As the roofing membrane is processed, the film is difficult to flame in this area especially since the film is only loosely applied over the layer of scattered material.

The bituminous strips on the bottom side of the roofing membrane can be interrupted in longitudinal extension of the membrane so that a controlled vapor pressure equalization is ensured. The interruptions of a strip are hereby offset in relation to the interruptions of a neighboring strip.

The strips of bituminous material are made, for example, of heat-sensitive self-adhesive bitumen (WSKB). The used bitumen suffers, however, shortcomings because once the roofing membrane is glued together, increased heat exposure through solar radiation results in a softening of the strips. This, in turn, may lead to bubble formation underneath the roofing membrane.

It would therefore be desirable and advantageous to provide an improved roofing membrane to obviate prior art shortcomings.

SUMMARY OF THE INVENTION

According to one aspect of the present invention, a roofing membrane includes at least one support layer, a plurality of strips arranged in spaced-apart disposition on at least one side of the support layer and made of bituminous material, wherein the strips of bituminous material have a penetration depth between about 120 and 170 at a temperature of 50° C., and a softening point between about 100° C. and 110° C., a layer of scattered material separating the bituminous strips from one another, and a fusible film which covers the strips of bituminous material and is composed of a plurality of film strips which are oriented in parallel relationship to the bituminous strips but not interconnected.

To ensure clarity, it is necessary to establish the definition of several important terms and expressions that will be used throughout this disclosure. The term "penetration depth" relates to DIN [German Industrial Standard] 52 010 and is determined here at a temperature of 50° C. The penetration depth, indicated in units of $\frac{1}{10}$ mm, denotes the depth of a needle to penetrate the bituminous material within five seconds. The term "softening point" relates to DIN 52 011 and is the measured softening point of ring and ball (R.a.B. method).

The bituminous material may be made, for example, of up to about 65% of straight-run bitumen, up to about 15% of oxidation bitumen, up to about 10% of block polymer styrene butadiene and up to about 10% of oleoresins.

The support layer may be multilayered, e.g. with the outermost layer of the support layer on top side of the roofing membrane and the layer on the bottom side of the roofing membrane made of a coat of sand as layer of scattered material.

Bituminous strips of this type retain their shape even when exposed to intense solar radiation. Moreover, these material properties enable a rapid liquefaction of the strips and thus a convenient handling of the roofing membrane.

As the fusible film is composed of a plurality of separate strips, moisture is able to escape via at least small interstices between the individual film strips and thus prevented from accumulating between the film and the support layer. Therefore, the film can easily be melted away when the roofing membrane is welded.

The strips of bituminous material may be arranged on the bottom side only, on both sides, or on the top side only, of the roofing membrane. When applied only on the top side of the roofing membrane, bituminous material is also always applied upon the bottom side of the membrane, however, not in the form of strips but e.g. in full contact over the entire area. When the underside of the roofing membrane is in full contact with bituminous material, the fusible film is placed over the bituminous material in single-piece configuration. This embodiment is applicable, when the roofing membrane is intended for application upon trapezoidal metal sheets. In this case, a maximum gluing surface can be established between the trapezoidal metal sheet and the roofing membrane.

In particular, when the strips of bituminous material are arranged upon the bottom side of the roofing membrane, the film strips may be separated from one another by a breach. In this way, moisture can escape via the thus-shaped slot, suitably incorporated at the manufacturer's end. When the strips of bituminous material are applied upon the top side of the roofing membrane, it may be suitable that the film strips essentially cover only the strips of bituminous material. This may be realized, for example, at the manufacturer's end, where a film is initially applied over the entire membrane surface and then removed in the regions between the strips, e.g. by means of hot air. In these regions, the layer of scattered material on the support layer is exposed.

All strips of bituminous material arranged upon the top side of the roofing membrane may extend over an entire length of the roofing membrane. Compared to interrupted strips, a greater gluing surface can hereby be made available. The provision of a vapor pressure equalization is secondary here because of the subjacent layer, typically a plate-shaped heat insulation, in the produced state of the roofing membrane.

According to another feature of the present invention, the bituminous strips upon the bottom side of the roofing membrane may be discontinuous in longitudinal direction of the roofing membrane. In this way, bubble formation is prevented once the roofing membrane is placed, and a pressure equalization can be realized over the entire roof area. The strips, positioned at the edge of the roofing membrane are, however, of continuous configuration also upon the bottom side of the roofing membrane.

According to another feature of the present invention, the bituminous strips may cover at least 50% of the side of the support layer, thereby realizing a good gluing capability of the roofing membrane.

According to another feature of the present invention, the bituminous strips may have varying width. A membrane side may have strips of a width of 2 to 2.5 cm and strips of a width of about 8 cm. This configuration may be applied, for example, when welding a roofing membrane with another overlapping roofing membrane, so as to realize a continuous welding seam with a width of about 8 cm. It is also conceivable to apply upon the top side of the membrane bituminous strips of same width, e.g. 8 cm (represents the standard seam width between two adjoining overlapping membranes).

According to another feature of the present invention, the bituminous strips may have a grooved surface.

According to another feature of the present invention, the film may be needled.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
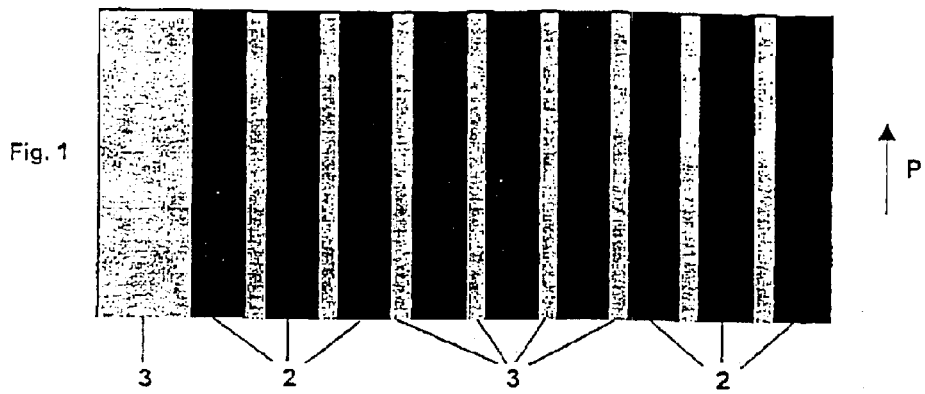
FIG. 1 is a schematic illustration of a top side of a roofing membrane according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a schematic illustration of a top side of a roofing membrane according to the present invention, including a multilayered support layer (FIG. 2), made of, e.g., polyester, glass fiber, aluminum in the form of nonwoven material, a lattice or film, or a combination of the afore-stated material. A coat of sand 3 is applied on the upper side of the support layer 4, and a coat of sand 3' is applied on the lower side of the support layer 4. Placed on the top side of the roofing membrane are strips 2 of bituminous material, e.g. of heat-sensitive self-adhesive bitumen, whereas the bottom side has applied thereon strips 2' of bituminous material, e.g. of heat-sensitive self-adhesive bitumen. The bituminous strips 2, 2' are provided for gluing the roofing membrane and extend in longitudinal direction, as indicated by arrow P, of the roofing membrane. Suitably, the bituminous strips 2, 2' cover at least 50% of the top and bottom side of the support layer, respectively, thereby realizing a good gluing capability of the roofing membrane.

The bituminous material of the strips 2, 2' has a needled penetration depth of about 120 to 170 at a temperature of 50° C. (according to the method outlined in DIN 52 010, which, however, relates to a temperature of 25° C.), and a soft turning point according to the ring and ball method (R.a.B.) between 100° C. and 110° C. (DIN 52 011). These material properties ensure an excellent dimensional stability of the bituminous strips 2, 2' even when exposed to high temperatures, e.g. during intense solar radiation.

Figure 2B:
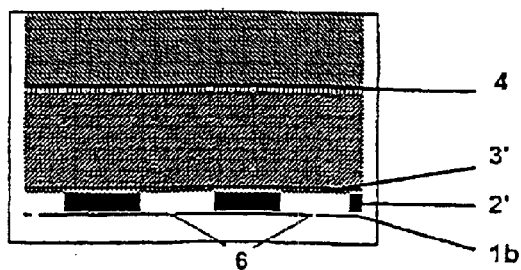
FIG. 2b is an enlarged detailed view of the area encircled and marked B in FIG. 1.
Figure 3:
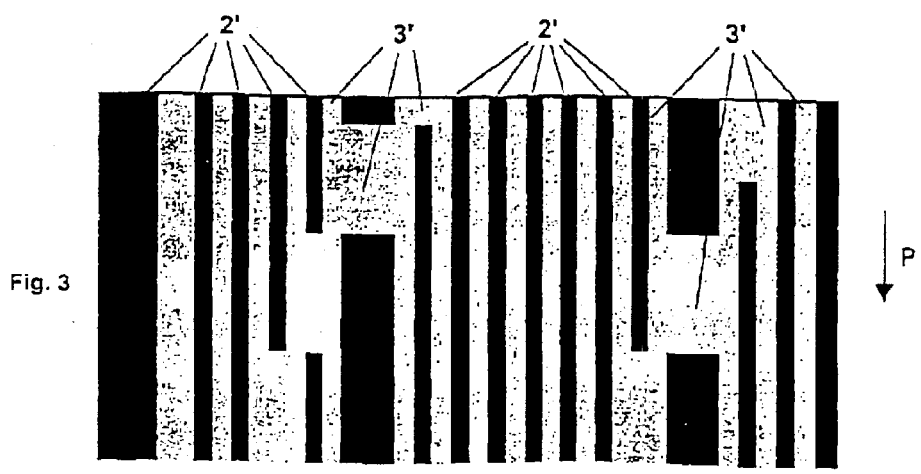
FIG. 3 is a schematic illustration of an underside of the roofing membrane of FIG. 1.

The bituminous strips 2' on the bottom side of the roofing membrane are discontinuous in longitudinal extension (arrow P) of a roofing membrane, as shown in particular in FIG. 3, and covered by a hot-melt adhesive film 1b. As shown in particular in FIG. 2b, the adhesive film 1b is formed in the spacing between the single bituminous strips 2' in the area of the coat of sand 3', which is not covered by the bituminous strips 2', with respective breaches 6 to thereby exhibit a strip-shaped configuration. As a consequence, moisture potentially accumulating between the adhesive film 1b and the coat of sand 3' can escape.

Figure 2A:
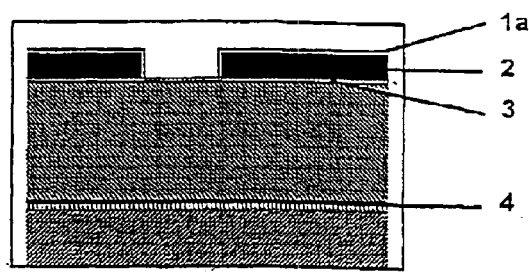
FIG. 2a is an enlarged detailed view of the area encircled and marked A in FIG. 1.
Figure 2:
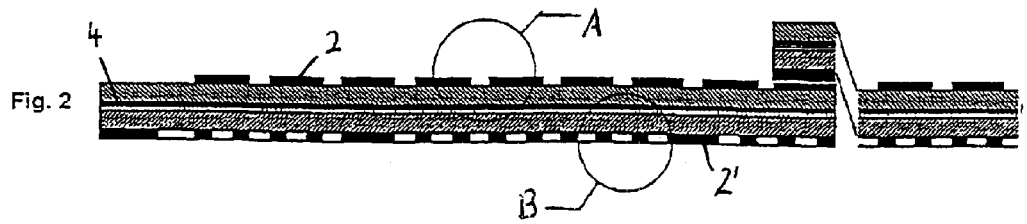
FIG. 2 is a cross section of the roofing membrane of FIG. 1.

The bituminous strips 2 on the top side of the roofing membrane extend over the entire length thereof, as shown in FIG. 1, and are covered by a hot-melt adhesive film 1a, as shown in FIG. 2a. The adhesive film 1a has also a strip-shaped configuration, and each strip of the adhesive film 1a is dimensioned to just about cover a bituminous strip 2. The coat of sand 3 is thus exposed in the area between the bituminous strips 2.

The application of the hot-melt adhesive films 1a, 1b ensures a reliable flaming of the films 1a, 1b, when the roofing membrane is placed. Thus, the flaming operation cannot be adversely affected by interfering moisture.

Although not shown in the drawing, the bituminous strips 2, 2' may have a grooved surface, and the films 1a, 1b may be needled.

Figure 4:
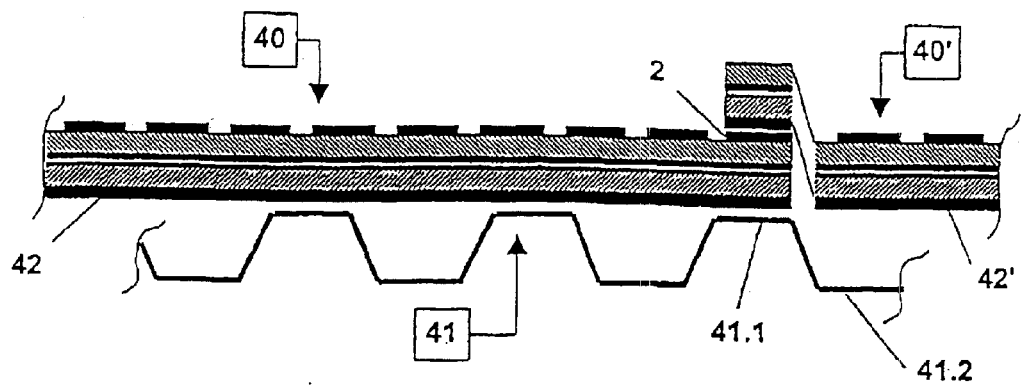
FIGS. 4 to 6 are schematic illustrations of roofing membranes applied on a trapezoidal metal sheet.
Figure 5:
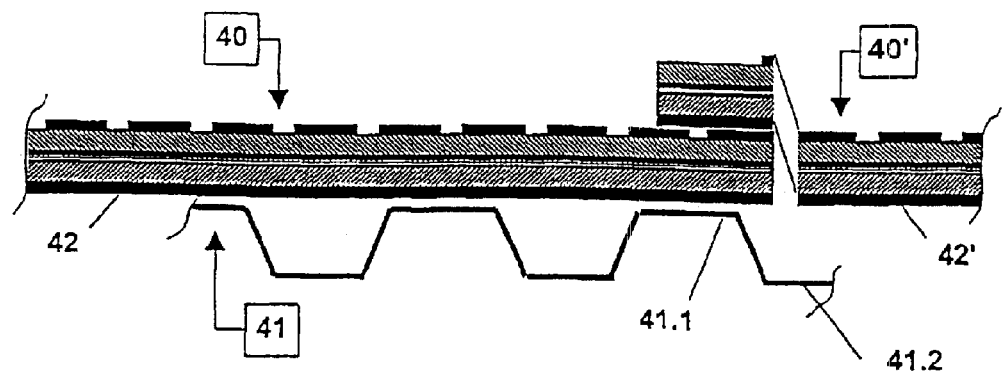
Figure 6:
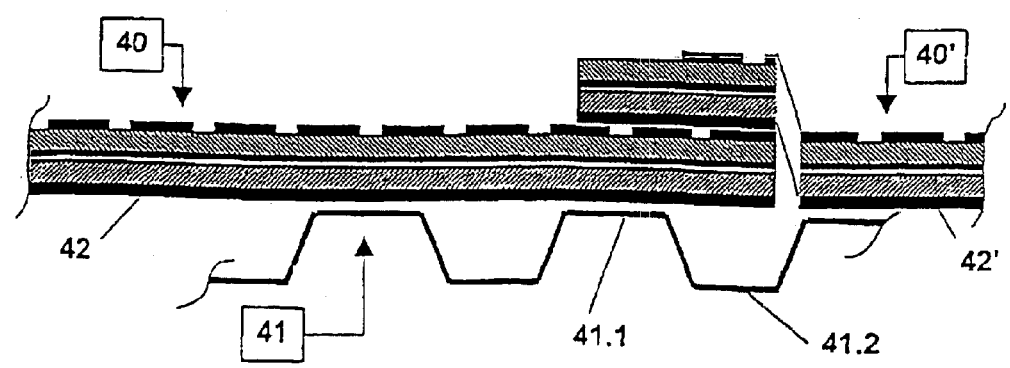

Turning now to FIGS. 4 to 6, there is shown a roofing membrane for application upon a trapezoidal metal sheet 41, whereby two overlapping roofing membranes 40 and 40' are depicted at a width of about 1 m each. The membranes 40, 40' are covered over their entire bottom side with a layer 42, 42' of bituminous material. The top side of the membranes 40, 40' is provided with strips 2 of bituminous material and a width of each strip 2 of about 8 cm.

The membranes 40, 40' overlap in the zone of a peak depression 41.1 of the trapezoidal metal sheet 41. The width of the overlapped zone is hereby dependent on the relative disposition of the membrane 40 upon the trapezoidal metal sheet 41 as well as on the width of the respective peak depression 41.1. In the exemplified embodiments of FIG. 4, the lateral boundary of the membrane 40 is so configured that a bituminous strip 2 with a width of about 8 cm is positioned at the marginal area of the membrane 40 precisely above the peak depression 41.1. The membrane 40' is placed with the standard overlap of also 8 cm, i.e. the membrane 40' overlaps the membrane 40 only in the area of the strip 2.

In the exemplified embodiments of FIGS. 5 in 6, the lateral boundary of the membrane 40 is positioned above a valley depression 41.2 of the trapezoidal metal sheet 41. The membrane 40' is positioned at such an overlap that the membrane 40' covers the region of the membrane 40 which covers the region of the peak depression 41.1. The overlap has a width of about 16 cm in the exemplified embodiment of FIG. 5, and a width of about 22 cm in the exemplified embodiment of FIG. 6.

A roofing membrane, as illustrated in FIGS. 4 to 6, results between overlapping membranes in a sufficiently wide weld seam which should have a width of at least 8 cm to match the width of the strip 2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A roofing membrane, comprising:
   at least one support layer;
   a plurality of first strips arranged in spaced-apart disposition on at least one side of the support layer and made of bituminous material, wherein the first strips of bituminous material have a penetration depth between about 120 and 170 at a temperature of 50° C., and a softening point between about 100° C. and 110° C., wherein the first strips include about 65% of straight-run bitumen, about 15% of oxidation bitumen, about 10% of block polymer styrene butadiene, and about 10% of oleresins;
   a layer of scattered material separating the first strips from one another; and
   a fusible film which covers the first strips of bituminous material, said film being composed of a plurality of second strips which are oriented in parallel relationship to the first strips but not interconnected.

2. The roofing membrane of claim 1, wherein the second strips are separated from one another by a breach.

3. The roofing membrane of claim 1, wherein the second strips essentially cover only the first strips.

4. The roofing membrane of claim 1, wherein the one side of the support layer is the top side of the roofing membrane, wherein the first strips extend over an entire length of the roofing membrane.

5. The roofing membrane of claim 1, wherein the first strips are discontinuous in longitudinal direction of the roofing membrane for preventing bubble formation.

6. The roofing membrane of claim 1, wherein the first strips cover at least 50% of the one side of the support layer.

7. The roofing membrane of claim 1, wherein the first strips have varying width.

8. The roofing membrane of claim 1, wherein the first strips have a grooved surface.

9. The roofing membrane of claim 1, wherein the film is needled.

10. The roofing membrane of claim 1, wherein the layer of scattered material is a coat of sand.

\* \* \* \* \*